United States Patent [19]
Santeler et al.

[11] Patent Number: 5,986,880
[45] Date of Patent: *Nov. 16, 1999

[54] ELECTRONIC APPARATUS HAVING I/O BOARD WITH CABLE-FREE REDUNDANT ADAPTER CARDS THEREON

[75] Inventors: Paul A. Santeler, Cypress; Reza M. Bacchus, Houston; Michael L. Sabotta, Cypress, all of Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/876,730

[22] Filed: Jun. 16, 1997

[51] Int. Cl.⁶ .................................. G06F 1/16; H05K 7/10
[52] U.S. Cl. .......................... 361/684; 361/785; 361/803; 439/60
[58] Field of Search ..................................... 361/684, 686, 361/785, 788, 796, 803; 439/65, 67, 61, 77, 60, 637, 924.1

[56] References Cited

U.S. PATENT DOCUMENTS

| | | | |
|---|---|---|---|
| 4,152,750 | 5/1979 | Bremanour et al. | 361/686 |
| 4,237,546 | 12/1980 | Wells | 361/684 |
| 4,247,882 | 1/1981 | Prager et al. | 361/686 |
| 4,250,563 | 2/1981 | Struger | 361/686 |
| 4,256,091 | 3/1981 | Taska | 359/165 |
| 4,334,261 | 6/1982 | Gonzales | 361/686 |
| 5,052,936 | 10/1991 | Biechler et al. | 439/60 |
| 5,162,002 | 11/1992 | Regnier | 439/637 |
| 5,239,748 | 8/1993 | Hamilton | 439/60 |
| 5,241,631 | 8/1993 | Smith et al. | 361/785 |
| 5,317,477 | 5/1994 | Gillett | 361/788 |
| 5,421,002 | 5/1995 | Lee et al. | 395/575 |
| 5,536,176 | 7/1996 | Borchew et al. | 439/61 |
| 5,576,935 | 11/1996 | Freer et al. | 710/126 |
| 5,650,910 | 7/1997 | Winick et al. | 361/788 |
| 5,715,146 | 2/1998 | Hoppal | 361/796 |
| 5,761,030 | 6/1998 | Roscoe | 361/684 |
| 5,810,623 | 9/1998 | Regnier et al. | 439/637 |
| 5,813,883 | 9/1998 | Lin | 439/637 |

Primary Examiner—Lynn D. Feild
Assistant Examiner—Lisa S. Lea-Edmonds
Attorney, Agent, or Firm—Konneker & Smith, P.C.

[57] ABSTRACT

The cage-supported hard disk drives in a computer server system are coupled to connectors on the cage back plane circuit boards and are controlled by a pair of array controller cards which are hot-plug connected in a redundant manner on the system I/O board using a pair of connectors mounted on the I/O board, each connector having first and second sets of electrical contacts thereon. Connector edge portions of the array controller cards are plugged into the I/O board connectors and have first and second sets of electrical contacts that engage the corresponding first and second sets of electrical contacts on their associated I/O board connectors. Formed on the I/O board are (1) a peripheral interconnect bus structure connected to the first sets of connector electrical contacts, (2) an electrical bus structure connected to the second sets of connector electrical contacts and associated cable connectors, and (3) an intercontroller bus structure connected between the second sets of connector electrical contacts and enabling the two array controller cards to communicate with one another independently of the peripheral interconnect bus structure. Electrical cables are interconnected between the electrical bus structure and the back plane circuit boards to couple the array controller cards thereto in a redundant control manner without requiring direct cable connection to either of the array controller cards.

19 Claims, 3 Drawing Sheets

ELECTRONIC APPARATUS HAVING I/O BOARD WITH CABLE-FREE REDUNDANT ADAPTER CARDS THEREON

BACKGROUND OF THE INVENTION

1. Field of the Invention

The present invention generally relates to computer apparatus and, in a preferred embodiment thereof, more particularly relates to the hot pluggable, redundant connection of adapter cards, such as hard disk drive array controller cards, to an associated I/O board in a computer system such as a server system.

2. Description of Related Art

In a conventionally constructed computer server system a series of portable media storage devices, typically hard disk drives, are removably insertable into support cage structures and are provided with electrical connectors that are removably mateable with corresponding connectors on back plane circuit boards within the support cage structures in response to insertion of the disk drives into their associated cage structures.

This conventional type of server system also typically comprises a system I/O board having one or more array controller cards thereon which are used to control the operation of the cage-supported hard disk drives. The array controller cards are electrically coupled to the back plane connectors within the support cage structures by means of flexible cables suitably interconnected between the back plane circuit boards and cable connectors mounted on the array controller cards.

For a variety of reasons it has become desirable to provide computer server systems of this type with array controller card hot plug redundancy such that (1) each controller card has a backup-card on the I/O board which can assume control of the associated disk drive(s) if the first card fails, and (2) during system operation any array controller card or its back-up card may be removed from the I/O board without disrupting hard disk drive operation or server system operation.

Attempts to provide this desirable controller card hot plug redundancy have, however, been frustrated by current cabling configurations of available array controller cards. Specifically, conventional array controller cards have one or more cable connectors provided thereon to which one or more electrical ribbon or bundled cable ends may be coupled. When a conventionally constructed controller card and an associated redundant back-up controller card are to be operatively connected to a support cage back plane circuit board, it is necessary to utilize a ribbon cable with three mating connectors. The connectors are located at each end of the cable, and some suitable distance along the length of the cable. One end of the cable is connected to the first card. The connector along the length of the cable is connected to the second card, and the other end of the cable is connected to the back plane circuit board.

Such required card interconnection cabling technique can provide the server system with controller card redundancy, but undesirably breaks the connection between the two cards and their associated back plane circuit board in the event that the second controller card (i.e., the one to which the connector along the length of the ribbon cable is connected) has to be removed from the I/O board. This is due to the fact that the second card is, in effect, "trapped" by the external cabling, which has to be disconnected from both cards to allow the second card to be removed from the I/O board. In turn, this undesirably terminates electrical communication between both cards and the back plane circuit board, and prevents the desired hot plug connection of the second card to the system I/O board.

This hot plug redundancy connection problem, to which the present invention is directed, is not limited to array controller cards in computer server systems, but is also manifested in systems utilizing other types of adapter cards such as, for example, network interface adapter cards and system management cards.

SUMMARY OF THE INVENTION

In carrying out principles of the present invention, in accordance with a preferred embodiment thereof, computer apparatus is provided which comprises a circuit board; a controllable device having means associated therewith for mounting it on the circuit board; an I/O board; first and second adapter card connectors mounted on the I/O board; and first and second adapter cards each adapted to control the controllable device and operatively coupled to one of the adapter card connectors.

Representatively, the computer system is a computer server system, the controllable device is a hard disk drive, and the adapter cards are hard disk drive array controller cards. However, principles of the invention could be alternatively utilized to advantage in other types of systems, with controllable devices other than hard disk drives, and with adapter cards other than array controller cards such as, by way of example only, network interface cards and system management cards.

According to a key feature of the invention, the computer apparatus has incorporated therein card connection structure which uniquely permits the first and second adapter cards to redundantly control the controllable device without the use of any cable members being directly connected to either adapter card, and with the adapter cards being hot-plugged to the I/O board in a manner permitting either card to be inserted or removed from the I/O board without disrupting the device control capabilities of the remaining card.

In a preferred embodiment thereof, this card connection structure includes first and second sets of electrical contacts disposed on each of the adapter card connectors; and portions of the first and second adapter card respectively and releasably mated to the first and second adapter card connectors, with each of the first and second adapter card portions having first and second sets of electrical contacts disposed thereon and respectively engaged with the first and second sets of electrical contacts on its associated adapter card member.

The card connection structure, in such preferred embodiment thereof, further includes a peripheral interconnect bus structure carried by the I/O board and coupled to the first sets of electrical contacts on the first and second adapter card connectors; an electrical bus structure carried by the I/O board and coupled to the second sets of electrical contracts on the first and second adapter card connectors; and an electrical coupling member, representatively an electrical ribbon cable, interconnected between the electrical bus structure and the back plane circuit board and enabling the first and second adapter cards to redundantly control the controllable device.

Preferably, the card connection structure further comprises an intercontroller bus structure carried by the I/O board and operative to permit the first and second adapter cards to communicate with one another independently of the peripheral interconnect bus structure, and independently of the electrical bus interconnected between the first and second adapter card connectors and the back plane circuit boards.

DETAILED DESCRIPTION

Figure 1:
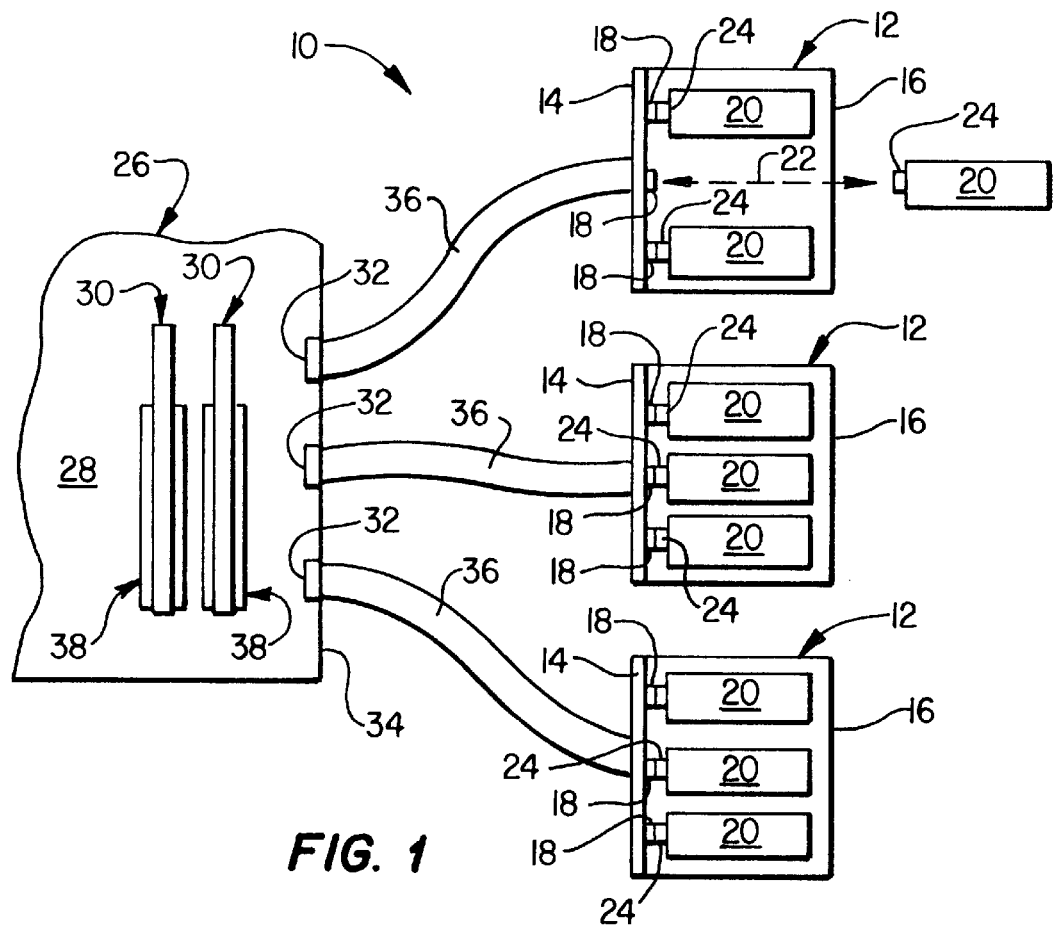
FIG. 1 is a highly schematic illustration of a portion of a representative computer server system embodying principles of the present invention.

Schematically illustrated in FIG. 1 is a representative computer server system 10 which embodies principles of the present invention and includes a plurality of support cage structures 12 (illustratively three in number) having back plane circuit boards 14 mounted on closed rear sides of the cages opposite open front sides 16 thereof. Representatively, each back plane circuit board 14 has three spaced apart, forwardly facing hot plug connectors 18 disposed thereon.

Each support cage structure 12 has associated with it three portable media storage devices in the form of the illustrated hard disk drives 20 which are removably insertable into the cage interior as indicated by the double-ended arrow 22. An electrical connector 24 is suitably supported at the rear of each disk drive 20 and is removably mated with one of the back plane connectors 18 when the disk drive is rearwardly inserted into its associated cage structure 12.

Still referring to FIG. 1, the server system 10 also includes a system I/O board 26 having a substrate body portion 28 with a pair of adapter cards, illustratively array controller cards 30, mounted on its top side as viewed in FIG. 1. Three mutually spaced cable connectors 32 are mounted on the I/O board body 28, representatively along an edge portion 34 thereof, in a spaced apart relationship with the array controller cards 30. Each back plane circuit board 14 is electrically coupled to the circuitry on the system I/O board by a ribbon-type connector cable 36 operatively coupled at its opposite ends to the back plane circuit board and an associated I/O board cable connector 32.

According to a key aspect of this invention, the two array controller cards 30 redundantly control the cage-supported hard disk drives 20, and are each provided with a hot-plug connection to the system I/O board 26, without the use of any external cable members directly connected to either of the cards 30. Thus, either of the array controller cards 30 may be removed from the system I/O board 26 without disconnecting a cable from the card to be removed or disrupting the disk drive-controlling functions of the remaining card during system operation.

Figure 2:
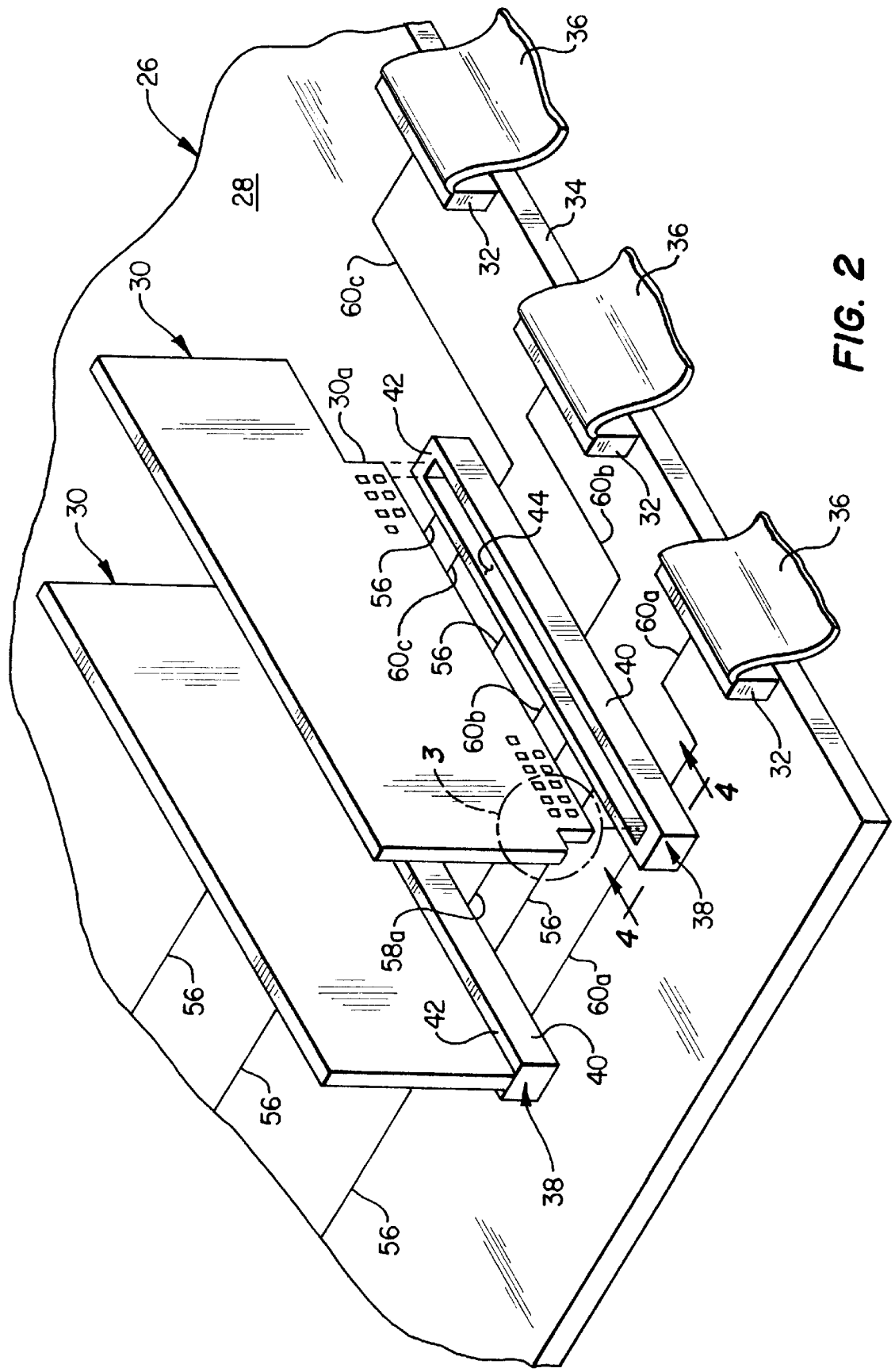
FIG. 2 is an enlarged scale, partially exploded schematic perspective view of an I/O board and associated controller card portion of the system.
Figure 3:
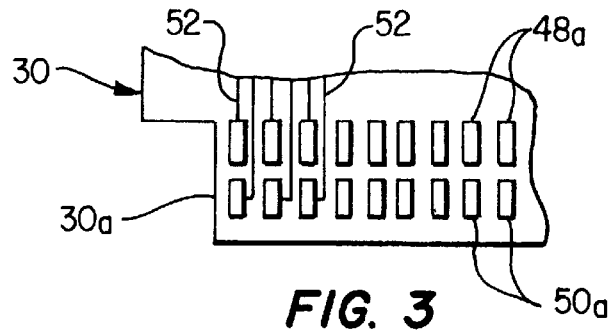
FIG. 3 is an enlarged scale elevational detail view of the circled controller card portion "3" in FIG. 2.
Figure 4:
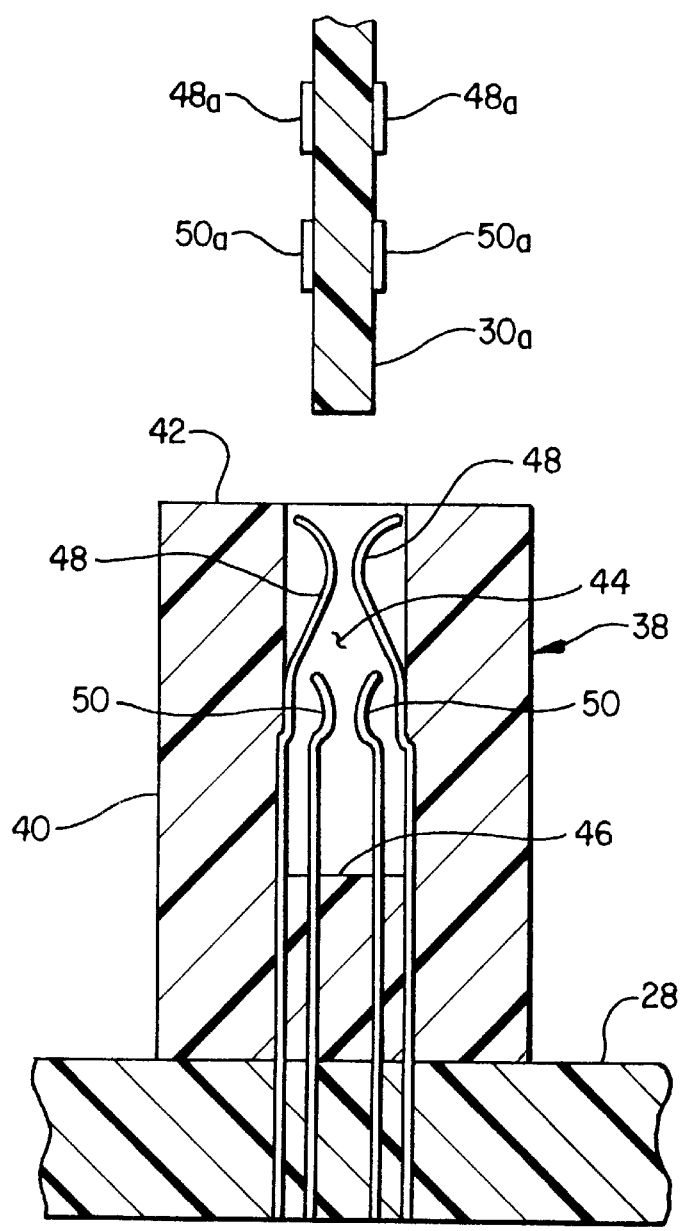
FIG. 4 is an enlarged scale simplified cross-sectional view through one of a pair of specially designed adapter card connectors, and a portion of an associated controller card upwardly removed therefrom, taken generally along line 4—4 of FIG. 2.

Turning now to FIGS. 2–4, this unique cable-free redundant hot plug connection of the array controller cards 30 to the system I/O board 26 is achieved in part by providing the cards 30 with coupling conformity with a pair of specially designed socketed adapter card connectors 38 mounted on the I/O board body 28. Each connector 38 representatively has an elongated body 40 with a top side 42. A socket opening 44 extends downwardly through top side 42 and has a bottom or inner side surface 46 (see FIG. 4).

Spaced apart along the lengths of the opposite sides of each connector socket opening 44 are opposing sets of upper electrical contacts 48 having associated body portions extending downwardly through the connector body 40 into the I/O board body 28 and connected to I/O board circuitry (not shown in FIG. 4) as later described herein. Downwardly and horizontally inwardly offset from the opposing sets of upper electrical contacts 48 within each connector socket 44 are opposing sets of lower electrical contacts 50 having associated body portions extending downwardly through the connector body into the I/O board body 28 and also connected to I/O board circuitry as later described herein.

Each array controller card 30 has a bottom side edge connector portion 30a which is configured for removable insertion downwardly into the socket opening 44 in the body 40 of its associated adapter card connector 38. As best illustrated in FIGS. 3 and 4, each card edge connector portion 30a has, on each of its opposite sides, spaced upper and lower series of electrical contact members or "goldfingers" 48a,50a which respectively correspond to the series of connector contacts 48,50. Goldfingers 48a,48b are appropriately connected to the balance of their associated array controller card circuitry by means of smaller electrically conductive traces 52 as can best be seen in FIG. 3. Further, the vertically offset series of upper and lower goldfingers 48a,50a on each card connector edge portion 30a are positioned and configured to respectively engage the corresponding upper and lower interior connector contacts 48,50 when the card connector edge portion 30a is downwardly inserted into its associated connector body socket opening 44.

Figure 5:
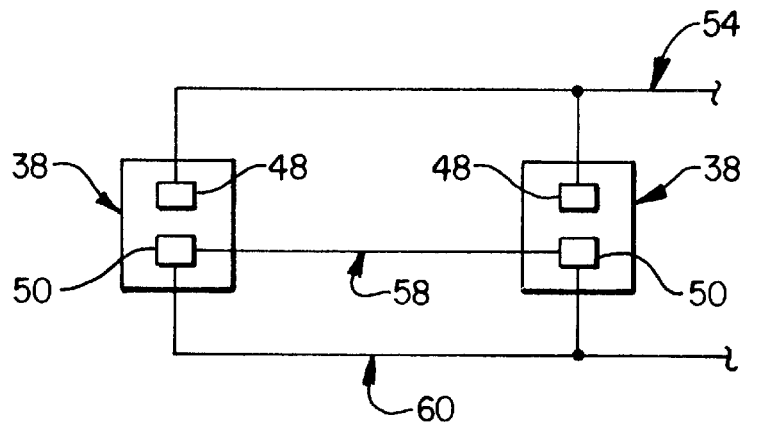
FIG. 5 is a highly schematic diagram of the connectors and the various I/O board bus links connected thereto.
Figure 5A:
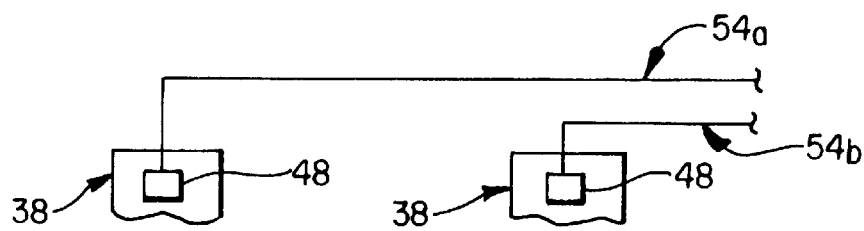
FIG. 5A is a highly schematic diagram similar to that in FIG. 5 but alternatively illustrating portions of the connectors with separate peripheral interconnect bus links coupled thereto.

Turning now to FIGS. 2 and 5, the upper connector contacts 48 are coupled to a peripheral interconnect bus structure 54 (see FIG. 5) which is incorporated in the I/O board 26 in the form of electrically conductive traces 56, a representative three of which are illustrated in FIG. 2. The peripheral interconnect bus structure 54, via the adapter card connectors 38, serves to operatively interconnect the array controller cards 30, peripheral components and other adapter cards on the I/O board 26 to a host processor. Peripheral interconnect bus structure 54 may be a common bus structure which is coupled to each of the connector electrical contact sets 48 as schematically illustrated in FIG. 5, or may consist of separate buses or separate portions of a bus 54a,54b which are separately connected to the upper electrical contact sets 48 of the two connectors 38 as schematically illustrated in FIG. 5A.

The lower electrical connector contacts 50 are coupled by an intercontroller bus link 58 (see FIG. 5) which, like the peripheral interconnect bus 54, is incorporated in the I/O board 26 and representatively includes an electrically conductive trace 58a as shown in FIG. 2. The intercontroller bus link 58 functions to permit the two redundantly installed array controller cards 30 to communicate with one another independently of the peripheral interconnect bus structure 54, and independently of the electrical bus 60 linking the adapter card connectors to the back plane circuit boards.

Finally, and according to a key aspect of the present invention, the lower electrical connector contacts 50, and thus the lower contacts 50a on the two array controller cards 30, are coupled to one another and to the three cable connectors 32 on the I/O board 26 by means of an electrical bus structure 60 (see FIG. 5) which is incorporated in the I/O board 26 and representatively includes the three electrically conductive traces 60a, 60b and 60c schematically depicted in FIG. 2 for illustrative purposes.

The unique provision of the electrical bus structure 60 couples the array controller cards 30 to the three cable members 36 remote therefrom and advantageously permits the installed cards 30 to (1) redundantly control the disk drives 20 (see FIG. 1) without the use of external cabling directly connected to either card 30, and (2) be "hot-plugged" to the I/O board in a manner such that removal or insertion of either card 30 will not disrupt the control of the disk drives during system operation.

Accordingly, unlike the case in conventionally configured array controller cards (and other types of adapter cards) neither of the cards 30 is "trapped" by a cable member directly connected thereto such that removal of its cable breaks its electrical connection (and that of the other card) to the card-controlled device.

In summary, due to the use of the specially configured connectors 38, the complementarily configured card edge connector portions 30a and the electrical bus structure 60, the cable-free array controller cards 30 are provided with hot-plug connections to the I/O board 26, and redundantly control the disk drives 20, with either card 30 being easily and quickly removable or insertable without disrupting the server system or the control function of the remaining card.

While the present invention has been representatively illustrated in a computer server system in which array controller cards are used to redundantly control hard disk drives, it will be readily appreciated by those of skill in this particular art that the invention may also be utilized to advantage in other types of systems having controlled devices other than hard disk drives. Additionally, the invention may be utilized in conjunction with adapter cards other than array controller cards such as, for example, network interface cards and system management cards.

The foregoing detailed description is to be clearly understood as being given by way of illustration and example only, the spirit and scope of the present invention being limited solely by the appended claims.

What is claimed is:

1. Computer apparatus comprising:

an I/O board;

an adapter card connector mounted on said I/O board, said adapter card connector being mateable with a portion of an adapter card and having first and second sets of electrical contacts engageable by corresponding electrical contacts on the adapter card portion;

a peripheral interconnect bus structure carried by said I/O board and coupled to said first set of electrical contacts;

an electrical bus structure carried by said I/O board, coupled to said second set of electrical contacts and useable to create, without the use of an external cable member directly connected to the adapter card, a cabled interconnection between the adapter card and an associated device controllable thereby; and a cable connector carried by said I/O board, electrically coupled to said electrical bus structure, and thus to said adapter card connector, and operatively connectable to a first end of an external cable having a second end operatively connectable to a device controllable by the adapter card to thereby electrically couple the device to the adapter card without the use of an external cable directly coupled to the adapter card.

2. The computer apparatus of claim 1 further comprising an adapter card having a portion with first and second sets of electrical contacts thereon, said adapter card portion being operatively mated with said adapter card connector and having first and second sets of electrical contacts respectively engaging said first and second sets of electrical contacts on said adapter card connector.

3. The computer apparatus of claim 2 wherein said adapter card is a hard disk drive array controller card.

4. Computer apparatus comprising:

an I/O board;

first and second adapter card connectors mounted on said I/O board, said first and second adapter card connectors being respectively mateable with portions of first and second adapter cards and each having first and second sets of electrical contacts engageable by corresponding electrical contacts on the adapter card portions;

a peripheral interconnect bus structure carried by said I/O board and coupled to said first sets of electrical contacts on said first and second adapter connectors;

an electrical bus structure carried by said I/O board, coupled to said second sets of electrical contacts on said first and second adapter card connectors and useable to create, without the use of external cable members directly connected to the first and second adapter cards, a cabled interconnection between the first and second adapter cards and an associated device redundantly controllable thereby; and a cable connector carried by said I/O board, electrically coupled to said electrical bus structure, and operatively connectable to a first end of an external cable member having a second end operatively connectable to a device redundantly controllable by the first and second adapter cards to thereby electrically couple the device to the first and second adapter cards without the use of external cables directly connected to the first and second adapter cards, either of the first and second adapter cards being removable from Its associated adapter card connector without breaking the electrical communication between the controllable device and the other of the first and second adapter cards.

5. The computer apparatus of claim 4 further comprising an intercontroller bus structure carried by said I/O board and operative to permit the first and second adapter cards to communicate with one another independently of said peripheral interconnect bus structure.

6. The computer apparatus of claim 4 further comprising first and second adapter cards each having a portion with first and second sets of electrical contacts thereon, said portions of said first and second adapter cards being respectively mated with said first and second adapter card connectors and each having first and second sets of electrical contacts respectively engaging said first and second sets of electrical contacts on its associated one of said first and second adapter card connectors.

7. The computer apparatus of claim 6 further comprising an intercontroller bus structure carried by said I/O board and operative to permit said first and second adapter cards to communicate with one another independently of said peripheral interconnect bus structure.

8. The computer apparatus of claim 6 wherein each of said first and second adapter cards is a hard disk drive array controller card.

9. Computer apparatus comprising:
a circuit board;
a controllable device having means associated therewith for mounting it on said circuit board;
an I/O board;
first and second adapter card connectors mounted on said I/O board, each of said first and second adapter card connectors having first and second sets of electrical contacts thereon;
first and second adapter cards each adapted to control said controllable device, said first and second adapter cards having portions respectively and releasably mated to said first and second adapter card connectors, each of said first and second adapter card portions having first and second sets of electrical contacts disposed thereon and respectively engaged with the first and second sets of electrical contacts on its associated adapter card connector;
a peripheral interconnect bus structure carried by said I/O board and coupled to said first sets of electrical contacts on said first and second adapter card connectors;
an electrical bus structure carried by said I/O board and coupled to said second sets of electrical contacts on said first and second adapter card connectors; and
an electrical coupling member interconnected between said electrical bus structure and said circuit board, in a manner electrically coupling said first and second adapter cards to said controllable device, and enabling said first and second adapter cards to redundantly control said controllable device without a direct cable interconnection between said first and second adapter cards and said controllable device.

10. The computer apparatus of claim 9 further comprising an intercontroller bus structure carried by said I/O board and operative to permit said first and second adapter cards to communicate with one another independently of said peripheral interconnect bus structure.

11. Computer apparatus comprising:
a circuit board;
a controllable device having means associated therewith for mounting it on said circuit board;
an I/O board;
first and second adapter cards each useable to control said controllable device; and
means for providing a hot plug connection on said I/O board for each of said first and second adapter cards and for enabling said first and second adapter cards to redundantly control said controllable device, said providing and enabling means including:
(1) first and second connector means for respectively and removably connecting said first and second adapter cards to said I/O board;
(2) a peripheral interconnect bus structure carried by said I/O board and electrically coupled to said first and second connector means;
(3) an electrical bus structure carried by said I/O board and electrically coupled to said first and second connector means; and
(4) an electrical connector member interconnected between said electrical bus structure and said circuit board and electrically coupling said first and second adapter cards to said controllable device without an external cable connection between said first and second adapter cards and said controllable device.

12. The computer apparatus of claim 11 wherein said controllable device is a disk drive, and said first and second adapter cards are hard disk drive array controller cards.

13. A computer server system comprising:
a support cage structure;
a back plane circuit board carried by said support cage structure and having a connector thereon;
a disk drive insertable into said support cage and having a connector associated therewith and mateable with said back plane connector to operatively couple said disk drive to said back plane circuit board;
a system I/O board;
first and second adapter card connectors mounted on said I/O board, each of said first and second adapter card connectors having first and second sets of electrical contacts thereon;
first and second array controller cards each adapted to control said disk drive, said first and second array controller cards having portions respectively and releasably mated to said first and second adapter card connectors, each of said first and second array controller card portions having first and second sets of electrical contacts disposed thereon and respectively engaged with the first and second sets of electrical contacts on its associated adapter card connector;
a peripheral interconnect bus structure carried by said I/O board and coupled to said first sets of electrical contacts on said first and second adapter card connectors;
an electrical bus structure carried by said I/O board and coupled to said second sets of electrical contacts on said first and second adapter card connectors; and
an electrical cable member carried by said I/O board, interconnected between said electrical bus structure and said back plane circuit board, and enabling said first and second array controller cards to redundantly control said disk drive,
said first and second adapter card connectors, said electrical bus structure and said electrical cable member providing for said first and second array controller cards an I/O board redundant hot slug connection without requiring a direct cable connection to either of said first and second array controller cards.

14. The computer server system of claim 13 further comprising an intercontroller bus structure carried by said I/O board and operative to permit said first and second array controller cards to communicate with one another independently of said peripheral interconnect bus structure.

15. In a computer system having an I/O board, a controllable device, and first and second adapter cards each useable to control the device, a method of providing a hot plug I/O board connection for the first and second adapter cards, enabling them to redundantly control the device without a direct cable connection to either adapter card, and permitting either card to be removed from the I/O board without disrupting the device controlling operation of the remaining adapter card, said method comprising the steps of:
mounting a pair of connectors on said I/O board, each of said connectors having first and second sets of electrical contacts thereon;
providing on the I/O board a peripheral interconnect bus structure coupled to said first sets of electrical contacts;
providing on the I/O board an electrical bus structure coupled to said second sets of electrical contacts;
mating the first and second adapter cards with said first and second connectors; and
electrically coupling the first and second adapter cards to the controllable device using a connection structure coupled to said electrical bus structure without direct physical attachment to either of the first and second adapter cards.

16. The method of claim 15 further comprising the step of extending between said second sets of electrical contacts an intercontroller bus structure carried by said I/O board and operative to permit the connector-mated first and second adapter cards to communicate with one another independently of said peripheral interconnect bus structure.

17. A computer server system comprising:

a support cage structure;

a back plane circuit board carried by said support cage structure;

a hard disk drive received in said support cage structure and operatively coupled to said back plane circuit board;

a system I/O board;

a cable connector mounted on said I/O board;

a cable member extending between and electrically coupling said cable connector and said back plane circuit board;

a first adapter card connector mounted on said I/O board;

a first array controller card removably mated to said first adapter card connector; and an electrical bus structure carried by said system I/O board and electrically coupling said first adapter card connector to said cable connector, said cable connector, said cable member and said first adapter card connector operatively coupling said first array controller card to said backplane circuit board without a direct cable connection to said first array controller card.

18. The computer server system of claim 19 wherein:

said computer server system further comprises a second adapter card connector mounted on said I/O board, and a second array controller card removably mated to said second adapter card connector, said electrical bus structure electrically couples said second adapter card connector to said cable connector, and said cable connector, said cable member and said second adapter card connector operatively couple said second array controller card to said backplane circuit board without a direct cable connection to said second array controller card.

19. Electronic apparatus comprising:

a main circuit board;

first and second adapter card connectors mounted on said main circuit board;

first and second adapter cards respectively and removably mated with said first and second adapter card connectors;

an external component redundantly controllable by said first and second adapter cards;

a cable connector carried by said main circuit board;

a bus structure carried by said main circuit board and having a portion operatively interconnected between said first and second adapter card connectors and said cable connector; and a cable interconnected between said cable connector and said external component, said first and second adapter cards being operative to redundantly control said external component, via said bus structure portion and said cable and without any direct external cable connection to either of said first and second adapter cards, either of said first and second adapter cards being removable from its associated one of said first and second adapter card connectors without breaking the electrical communication between said controllable device and the other of said first and second adapter cards.

* * * * *